United States Patent
Sander

(10) Patent No.: US 10,465,796 B2
(45) Date of Patent: Nov. 5, 2019

(54) SEALING ARRANGEMENT

(71) Applicant: SAMSON AG, Frankfurt am Main (DE)

(72) Inventor: Andreas Sander, Laudenbach (DE)

(73) Assignee: SAMSON AG, Frankfurt am Main (DE)

( * ) Notice: Subject to any disclaimer, the term of this patent is extended or adjusted under 35 U.S.C. 154(b) by 6 days.

(21) Appl. No.: 15/675,681

(22) Filed: Aug. 11, 2017

(65) Prior Publication Data
US 2018/0045311 A1 Feb. 15, 2018

(30) Foreign Application Priority Data
Aug. 12, 2016 (DE) .................... 20 2016 104 466 U

(51) Int. Cl.
*F16J 15/02* (2006.01)
*F16J 15/06* (2006.01)

(52) U.S. Cl.
CPC ............ *F16J 15/021* (2013.01); *F16J 15/061* (2013.01); *F16J 15/062* (2013.01)

(58) Field of Classification Search
CPC   F16J 15/021; F16J 15/02; F16J 15/022; F16J 15/061; F16J 15/062; F16J 15/00; F16J 15/06; F16J 15/025; F16J 15/027; F16J 15/0831
USPC ........................................................ 277/602
See application file for complete search history.

(56) References Cited

U.S. PATENT DOCUMENTS

| | | | | |
|---|---|---|---|---|
| 3,650,508 A | * | 3/1972 | Kosmala | ............... F16K 1/2263 251/173 |
| 2002/0130292 A1 | * | 9/2002 | Nolan | ..................... F16J 15/062 251/315.1 |
| 2013/0118424 A1 | * | 5/2013 | Street | ..................... F04B 15/08 123/41.35 |
| 2015/0167882 A1 | * | 6/2015 | Von Keitz | ............ B67D 7/3218 137/15.09 |

FOREIGN PATENT DOCUMENTS

| | | |
|---|---|---|
| DE | 2937456 | 4/1980 |
| DE | 19854346 | 4/2000 |
| DE | 102012103061 | 9/2013 |

OTHER PUBLICATIONS

German Patent and Trademark Office, German Search Report, dated Feb. 14, 2017, pp. 1-8, Application No. 202016104466.9, Applicant: SAMSON AG.

* cited by examiner

*Primary Examiner* — Nathan Cumar
(74) *Attorney, Agent, or Firm* — Woodling, Krost and Rust

(57) ABSTRACT

Sealing arrangement of a fluid system for use with cryogenic media, said arrangement comprising a sealing ring in which a first system component is connected to a second system component by means of the sealing ring which sealing ring further has a first sealing surface which sealingly engages the first system component and the sealing ring has a second sealing surface which sealingly engages the second system component which first sealing surface and second sealing surface of the sealing ring are designed such that the first and second system components in the area of the sealing surfaces extend radially within the sealing ring in a section plane which extends parallel to the direction of contraction, and the sealing ring when exposed to cold, contracts ther- (Continued)

mally to a greater extent than the first system component and the second system component.

12 Claims, 5 Drawing Sheets

SEALING ARRANGEMENT

German patent application serial no. 20 2016 104 466.9, filed Aug. 12, 2016 is incorporated herein in its entirety by reference hereto. Priority is claimed to German patent application serial no. 20 2016 104 466.9, filed Aug. 12, 2016.

The invention relates to a sealing arrangement of a fluid system component for operation with cryogenic media, in which a first system component is sealingly connected to a second system component by means of a sealing ring.

It is the object of the present invention to provide a sealing arrangement with improved sealing characteristics for use with cryogenic media and/or fluids.

A sealing arrangement according to the present invention comprises a sealing ring which connects a first system component to a second system component, which sealing ring—when exposed to cold—will shrink to a greater extent than the first and second system components. In a cross-sectional plane parallel to the direction of contraction, the area of sealing surfaces of the first and second system components, i.e. their sealing regions, extends radially within the sealing ring.

Now if the sealing ring shrinks to a larger extent than the first and second system components surrounded by it, this will yield improved sealing characteristics since the stronger thermal contraction of the sealing ring due to its exposure to cold will result in an increase of the contact pressure on the sealing surfaces. The first and second system components at least partially enclose a process area which may contain cryogenic fluid.

More particularly, the cross-section of the sealing ring is designed such that the sealing surfaces extend at an angle relative to the direction of contraction of the sealing ring. The sealing surfaces can thus be arranged to be orthogonal relative to the direction of contraction, but they can also be arranged at other angles relative to the direction of contraction, as long as this results in a vector component of the sealing surface that is directed radially inward.

In its simplest design, the sealing ring is in the form of a hollow cylinder whose inner shell surface defines two axially adjacent sealing surfaces for a sealing effect with a first and second system components. In this design, the sealing surfaces can either be directly adjacent to one another or be spaced from each other.

In another embodiment, the sealing ring is wedge-like in cross-section which causes the sealing surfaces to be inclined relative to the direction of radial contraction of the sealing ring in such a way that the sealing ring widens in cross-section on either side as it extends in a direction opposite to the direction of contraction of the sealing ring. An inclined, in particular wedge-like, arrangement will thus yield a larger sealing surface for a lower overall axial height.

The angle of inclination of the first sealing surface can also be different from the angle of inclination of the second sealing surface relative to the direction of contraction, for example.

As already set out above, exposure to cold will cause the sealing ring to contract, thus increasing the contact pressure of the sealing ring on the sealing surfaces, for which the sealing surface will not necessarily have to be disposed orthogonally to the direction of contraction. However, it must always be ensured that any contraction as a result of exposure to cold will occur toward the sealing surface, and thus result in an increase of the contact pressure. If the sealing surface is not disposed orthogonally relative to the direction of contraction, then any resulting contact pressure will be smaller than the contact pressure obtained in the case of a sealing surface which is disposed orthogonally relative to the direction of contraction, but the sealing surface may be larger because less installation space is required. When aligning the sealing surfaces relative to each other, it must always be taken into account that a vector component of the sealing surfaces is collinear with the direction of contraction.

In a preferred embodiment of the invention, the cross-section of the sealing ring can also be formed in the manner of an open hollow profile, with parts of a radially inner wall extending opposite a continuous outer wall, thus defining a cavity between the inner and outer walls and providing an opening which communicates with the process area. Preferably, a gap is provided for this purpose between the first and second sealing surfaces.

The cryogenic fluid can thus flow into this cavity and exert additional pressure on the sealing surfaces.

Preferably a first cavity is formed radially behind the first sealing surface and a second cavity is formed radially behind the second sealing surface. This results in improved sealing both against the first system component and against the second system component.

The contact pressure can be increased additionally if a spring ring is fitted in each cavity formed.

In a preferred embodiment the first system component can be designed as a valve component, in particular in the form of a valve cage. Similarly, the second system component can also be designed as a valve component, in particular in the form of a valve housing.

As an alternative, the first system component can be a valve cover, and the second system component can be a housing, in particular a valve housing.

In another preferred embodiment, a recess, in particular a circumferential groove, may be provided in the radially outer wall of the sealing ring. Consequently, a matching projection in the housing will reliable secure the sealing ring in an axial direction even in the case of temperature-induced diameter changes and still leave sufficient space for radial expansion or contraction.

Additional advantages, features and possible applications of the present invention may be gathered from the description which follows, when considered together with the embodiments illustrated in the drawings.

Throughout the description, the claims and the drawings, those terms and associated reference signs are used as are listed in the List of Reference Signs below. In the drawings FIG. 1 is a schematic partial sectional view of a cryogenic control valve according to the invention;

Figure 1:
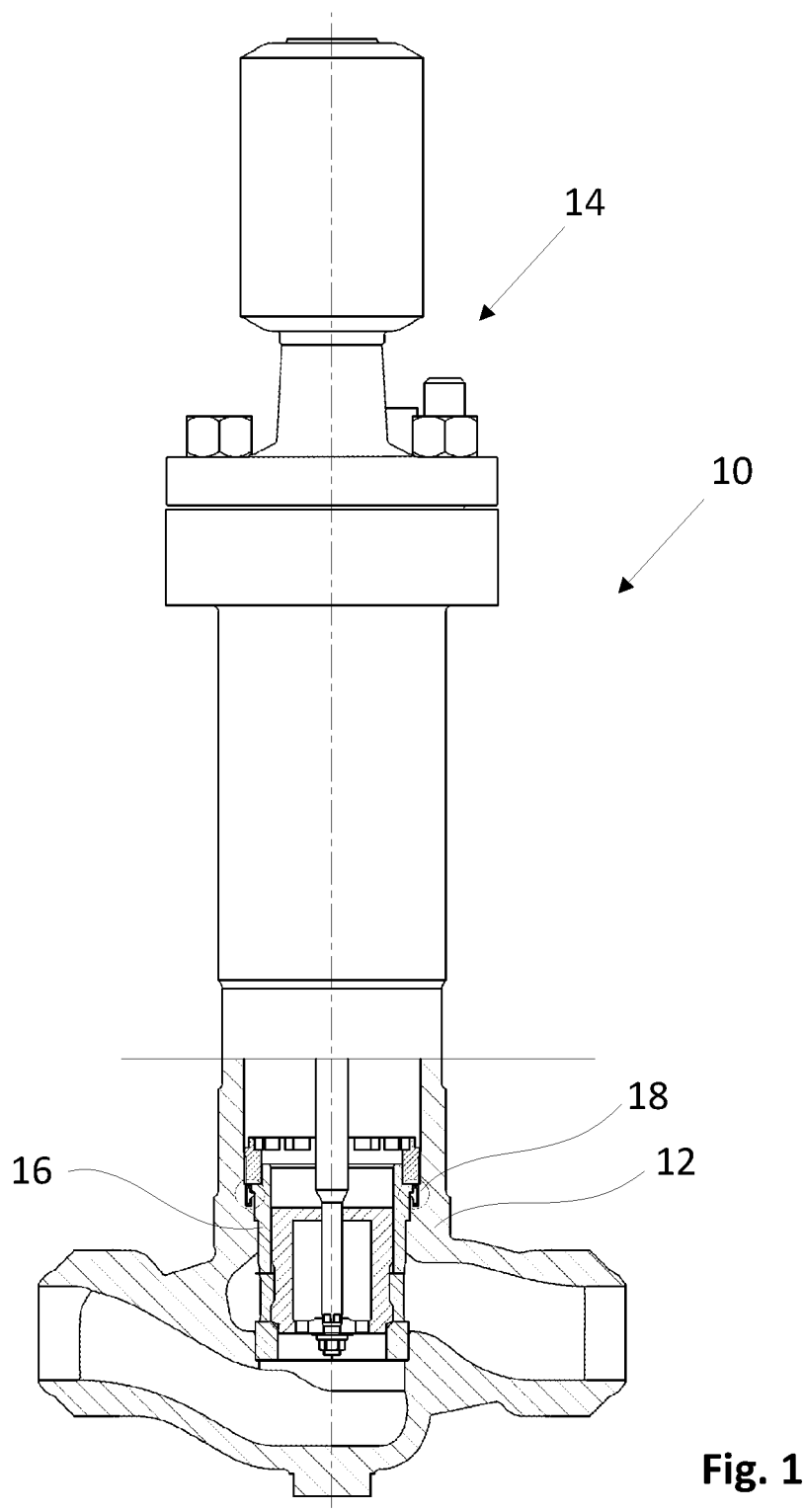

FIG. 1 is a schematic partial sectional view of a control valve 10 for cryogenic media, which valve comprises a valve housing 12 and an actuator 14. The embodiment illustrated is a cage valve which has the valve cage 16 sealed against the valve housing 12. This is achieved by means of a sealing ring 18 according to the invention. This sealing ring is illustrated more clearly in the enlarged detail view of FIG. 2.

Figure 2:
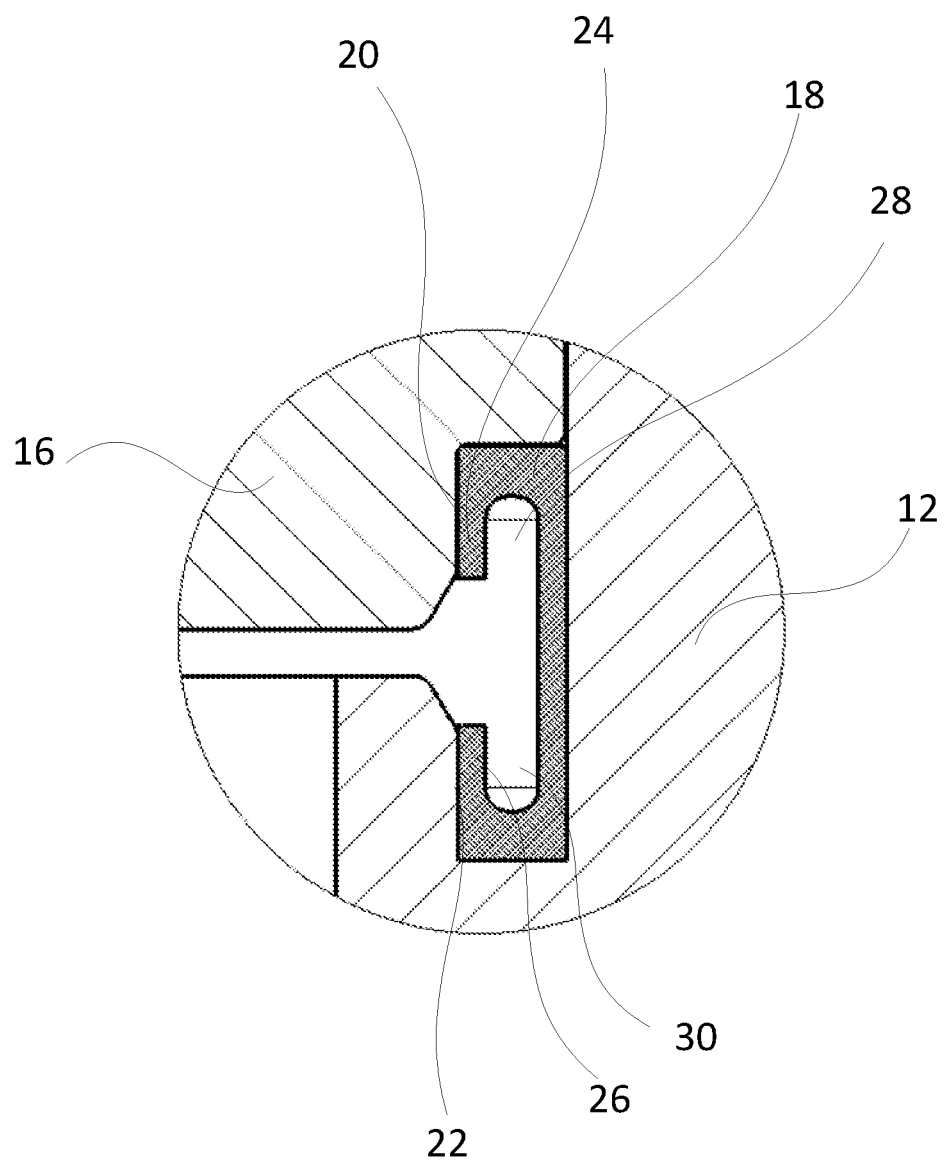
FIG. 2 is an enlarged detail view of the seal.

FIG. 2 is a cross-sectional view of an enlarged detail of the sealing ring 18, which ring 18 has a first sealing surface 20 thereof contacting the valve cage 16 and a second sealing surface 22 thereof contacting the valve housing 12. For this purpose, the valve housing 12 has an annular groove which extends axially in the housing and into which the sealing ring 18 can be fitted so that the latter will be able to surround the sealing area of the valve housing 12 created by the groove. Consequently, both the valve cage 16 and the sealing area of the valve housing 12 are located within the sealing ring 18. A cold-induced major contraction of the sealing ring 18 will consequently result in an increase in the contact pressure on the respective valve components 12, 16 and thus improve the sealing effect.

As can clearly be seen in this view, the sealing ring 18 is designed in the form of a hollow profile, and an opening in the form of a circumferential gap can be seen in the radially inner wall, which enables the interior of the sealing ring 18 to communicate with the interior of the valve. Furthermore, this design results in the creation of sealing lips 24, 26 which, on the radial inner side, constitute the sealing surfaces 20, 22 for the valve housing 12 and the valve cage 16. Between the sealing lips 24, 26 and the radially outer wall of the sealing ring 18 a cavity 28, 30 is formed each into which the cryogenic fluid can flow and thus additionally exert a radial contact pressure on the sealing areas.

Figure 3:
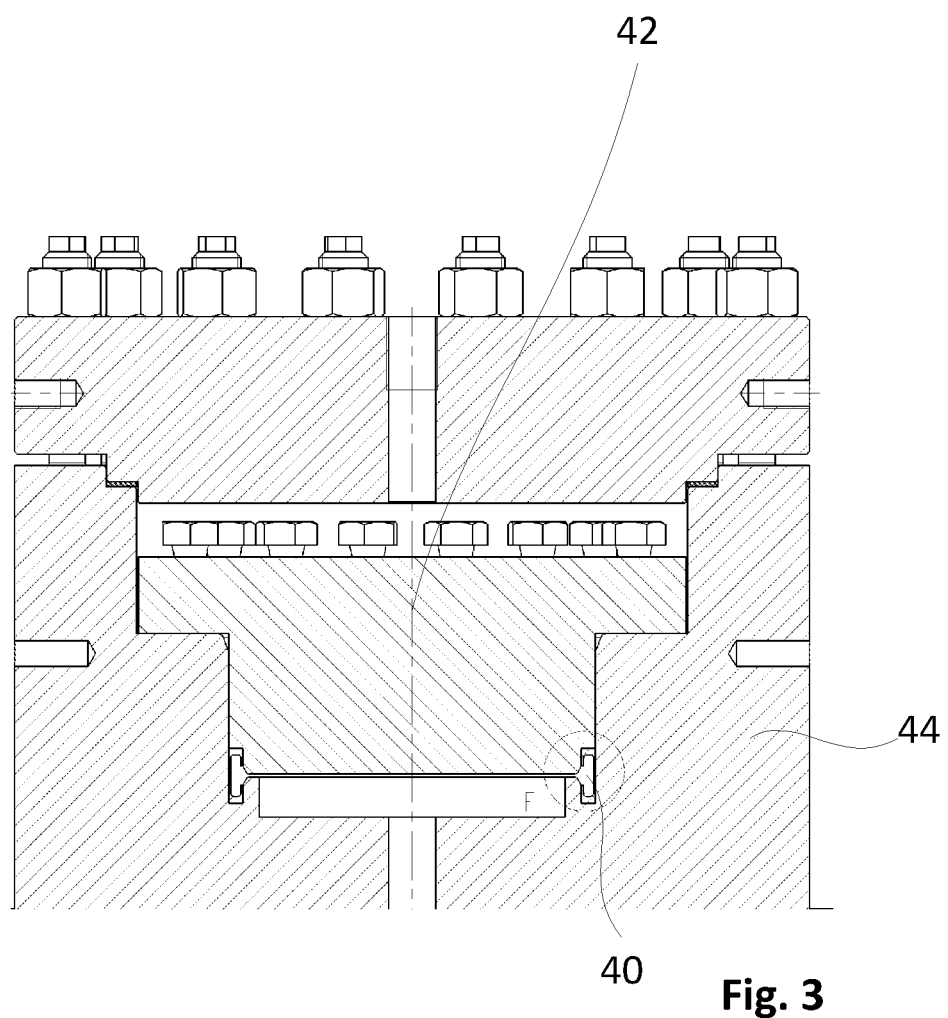
FIG. 3 is a view of another application of a sealing arrangement according to the invention.

FIG. 3 is a sectional view of another possible application for a sealing arrangement according to the invention. The sealing ring 40 connects a cover 42 to a housing 44 and thus seals a housing interior against the atmosphere. This arrangement can be part of a control valve or also of a line section. The function of the sealing ring 40 is as described in the example of the control valve of FIG. 2. It is to be noted here that the cover 42 and the sealing area of the housing 44 extend coaxially and are fixed in an axial direction.

Figure 4A:
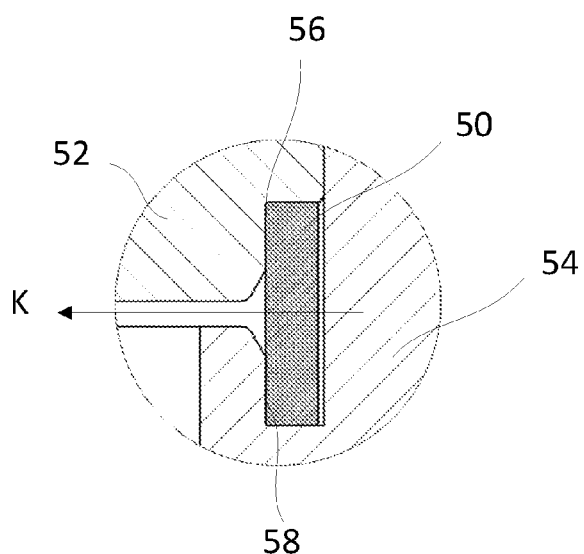
FIG. 4a is a cross-sectional view of a sealing ring.

FIG. 4a is a partial cross-sectional view of a sealing ring 50 of a simple design. The sealing ring 50 is rectangular in cross-section, for which reason the sealing ring 50 is in the form of a hollow cylinder. In the hollow cylinder there are two adjacent sealing surfaces 56, 58 which, in the present case, are also axially spaced from one another, i.e. a first sealing surface 56 in contact with a first system component 52 and a second sealing surface 58 in contact with a second system component 54. The sealing areas of both system components 52, 54 are disposed radially within the sealing ring 50, and the sealing surfaces 56, 58 are orthogonal to the direction of contraction K of the sealing ring 50.

Figure 4B:
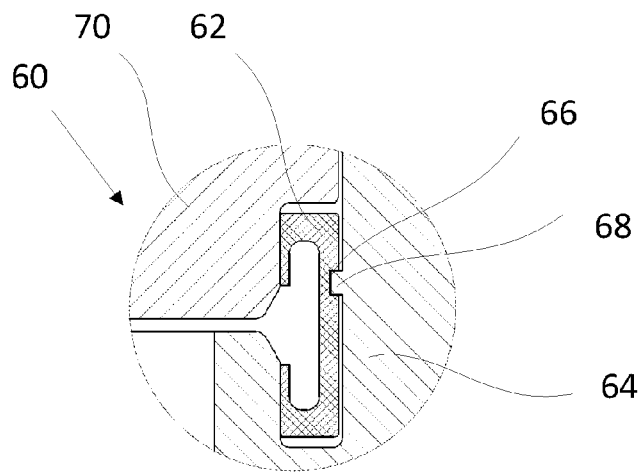
FIG. 4b is a view of another embodiment of a sealing arrangement.

FIG. 4b is a partial cross-sectional view of another embodiment of a sealing arrangement 60 with a sealing ring 62 having a hollow profile, of the type essentially already described with reference to FIG. 2. The sealing ring 62 of this embodiment additionally has a circumferential groove 68 in its outer wall, which groove 68 matches a projection 66 integrally formed on a first system component 64. This allows the sealing ring 62 to be fixed in an axial direction and leaves sufficient expansion space in a radial direction.

Figure 4C:
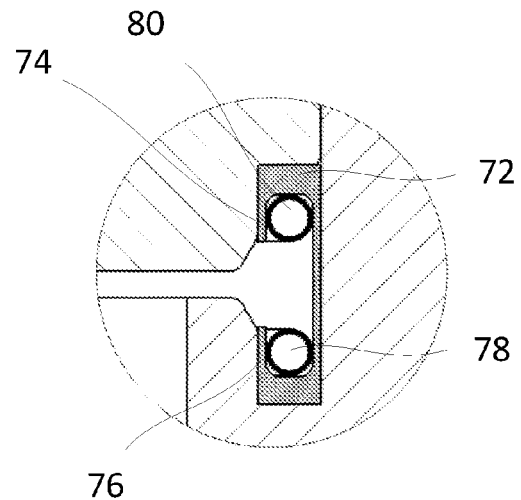
FIG. 4c is a view of another embodiment of a sealing arrangement.

FIG. 4c is a partial cross-sectional view of a sealing ring 72 similar to the one described with reference to FIG. 2. In this arrangement a spring ring 78, 80 each is located in the cavity behind the sealing lips 74, 76, which spring rings further contribute to the contract pressure provided by the fluid and the increased contact pressure as a result of the cold-induced thermal contraction.

Figure 5:
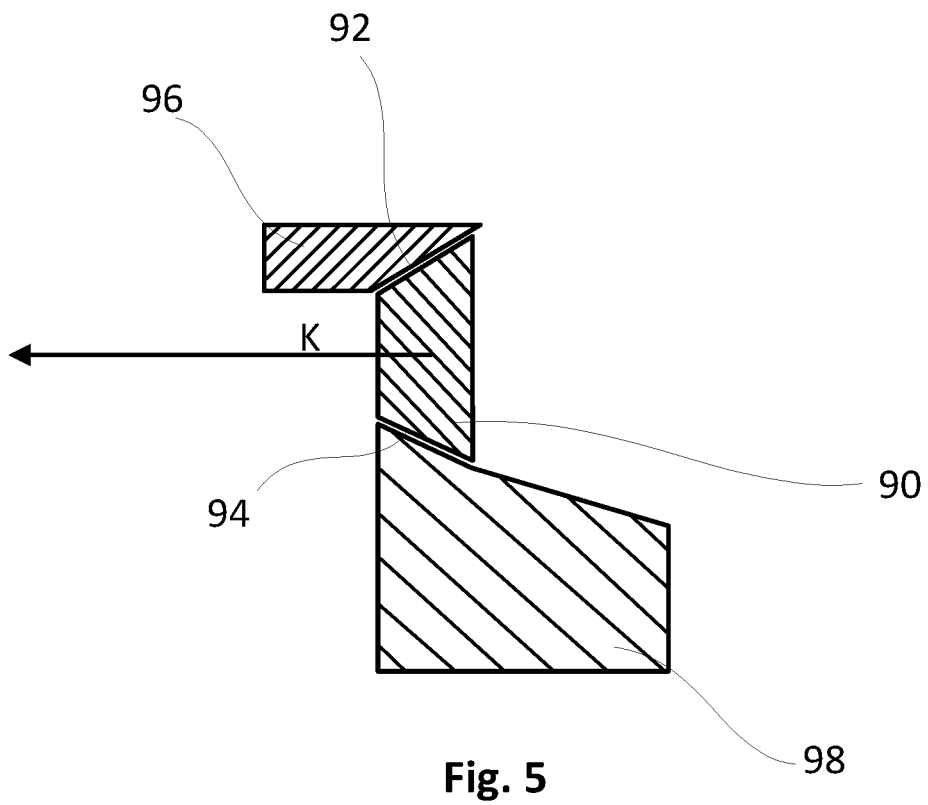
FIG. 5 is a view of an arrangement comprising a sealing ring which is wedge-shaped in cross-section.

FIG. 5 is a schematic partial cross-sectional view of an arrangement in which the sealing ring 90 is wedge-shaped in cross-section, with the first sealing surface 92 and the second sealing surface 94 being inclined relative to the direction of contraction K of the sealing ring 90. In this way, a sealing effect can be achieved over a larger surface area for a low overall height of the sealing ring 90. The sealing area of the first system component 96 and the sealing area of the second system component 98 are therefore located within the sealing ring 90 in a radial direction. So if one cuts through the arrangement in the area of the sealing surface 92, 94 in a direction parallel to the direction of contraction, the system component, as viewed in the direction of contraction K, will always be dis-posed in the sealing ring 90. This means that in the direction of contraction, the sealing ring 90 will press against the sealing area of a system component. As illustrated in the present example, this is not only the case for a sealing surface that is orthogonal to the direction of contraction, but also for a sealing surface that is inclined. With the inclined arrangement a larger sealing surface can be achieved for a lower overall axial height.

LIST OF REFERENCE SIGNS

10 Control valve
12 valve housing
14 actuator
16 valve cage
18 sealing ring
20 first sealing surface
22 second sealing surface
24 sealing lip
26 sealing lip
28 first cavity
30 second cavity
40 sealing ring
42 cover
44 housing
50 sealing ring
52 first system component
54 second system component
56 first sealing surface
58 second sealing surface
60 sealing arrangement
62 sealing ring
64 first system component
66 projection
68 groove
70 second system component
72 sealing ring
74 sealing lip
76 sealing lip
78 spring ring
80 spring ring
90 sealing ring
92 first sealing surface
94 second sealing surface
96 first system component
98 second system component
K direction of contraction

The invention claimed is:
1. Sealing arrangement of a fluid system for use with cryogenic media, comprising:
  a sealing ring in which a first system component is connected to a second system component by means of said sealing ring;
  a portion of said first system component and a portion of said second system component reside radially inwardly within said sealing ring;
  said sealing ring has a first sealing surface which radially and sealingly engages said portion of said first system component residing radially inwardly of said sealing ring and said sealing ring has a second sealing surface which radially and sealingly engages said portion of said second system component residing radially inwardly of said sealing ring; and, said sealing ring, when exposed to cold, contracts thermally to a greater extent than said first system component and said second system component.

2. Sealing arrangement according to claim 1, further comprising:

said sealing ring is of a cross-sectional shape in which at least one of said first and second sealing surfaces is inclined at an angle not equal to 90° relative to said direction of contraction K of said sealing ring.

3. Sealing arrangement according to claim 2, further comprising:

said sealing ring is wedge-shaped in cross-section, said first and second sealing surfaces being inclined relative to said direction of radial expansion of said sealing ring in such a way that said sealing ring increases in cross-section as it extends in a direction opposite to said direction of contraction.

4. Sealing arrangement according to claim 2, further comprising:

an angle of inclination of said first sealing surface is different from an angle of inclination of said second sealing surface.

5. Sealing arrangement according to claim 1, further comprising:

the cross-section of said sealing ring is C-shaped.

6. Sealing arrangement according to claim 5, further comprising:

said C-shaped in cross-section sealing ring includes a first cavity and a second cavity.

7. Sealing arrangement according to claim 6, further comprising:

a spring ring is mounted in each of said first and second cavities.

8. Sealing arrangement according to claim 1, further comprising:

said first system component is a first valve component and said second system component is a second valve component.

9. Sealing arrangement according to claim 1, further comprising:

said first valve component is a valve cage and said second valve component is a valve housing.

10. Sealing arrangement according to claim 1, further comprising:

said first system component is a valve cover, and said second system component is a valve housing.

11. Sealing arrangement according to claim 1, further comprising:

said sealing ring includes a radial outer wall; and, said radial outer wall of said sealing ring includes a circumferential groove.

12. Sealing arrangement of a fluid system for use with cryogenic media, comprising:

a sealing ring resides intermediate a first system component and a second system component;

the cross-section of said sealing ring is C-shaped;

said C-shaped in cross-section sealing ring includes a first cavity, a second cavity and an outer radial wall;

said first cavity, said second cavity and said outer radial wall are under pressure of said cryogenic media;

a portion of said first system component and a portion of said second system component reside radially inwardly within said sealing ring;

said sealing ring has a first sealing surface which radially and sealingly engages said portion of said first system component residing radially inwardly within said sealing ring and said sealing ring has a second sealing surface which radially and sealingly engages said portion of second system component residing radially within said sealing ring; and, said sealing ring, when exposed to cold, contracts thermally to a greater extent than said first system component and said second system component, said thermal contraction thus increasing the contact pressure of said first sealing surface on said portion of said first system component residing radially inwardly within said sealing ring and said thermal contraction thus increasing the contact pressure of said second sealing surface on said portion of said second system component residing radially inwardly within said sealing ring.

\* \* \* \* \*

UNITED STATES PATENT AND TRADEMARK OFFICE
CERTIFICATE OF CORRECTION

PATENT NO. : 10,465,796 B2
APPLICATION NO. : 15/675681
DATED : November 5, 2019
INVENTOR(S) : Sander It is certified that error appears in the above-identified patent and that said Letters Patent is hereby corrected as shown below:

In the Specification

Column 2, Line 35, after "will" delete "reliable" and insert --reliably-- therefor.

Column 4, Line 8, after "always be" delete "dis-posed" and insert --disposed-- therefor.

Signed and Sealed this
Fourteenth Day of January, 2020

Andrei Iancu
*Director of the United States Patent and Trademark Office*